(12) United States Patent
Whitehill

(10) Patent No.: US 7,190,672 B1
(45) Date of Patent: Mar. 13, 2007

(54) SYSTEM AND METHOD FOR USING DESTINATION-DIRECTED SPREADING CODES IN A MULTI-CHANNEL METROPOLITAN AREA WIRELESS COMMUNICATIONS NETWORK

(75) Inventor: Eric A. Whitehill, Ft. Wayne, IN (US)

(73) Assignee: MeshNetworks, Inc., Maitland, FL (US)

( * ) Notice: Subject to any disclaimer, the term of this patent is extended or adjusted under 35 U.S.C. 154(b) by 734 days.

(21) Appl. No.: 10/021,062

(22) Filed: Dec. 19, 2001

(51) Int. Cl.
H04J 1/16 (2006.01)
H04J 3/14 (2006.01)

(52) U.S. Cl. .............. 370/235; 370/320; 370/335; 370/342; 370/437; 370/441

(58) Field of Classification Search ........ 370/235–252, 370/338–342, 355–396, 445, 320, 335, 441, 370/437
See application file for complete search history.

(56) References Cited

U.S. PATENT DOCUMENTS

| | | | |
|---|---|---|---|
| 4,494,192 A | 1/1985 | Lew et al. ............ 364/200 |
| 4,617,656 A | 10/1986 | Kobayashi et al. ...... 370/74 |
| 4,736,371 A | 4/1988 | Tejima et al. ........ 370/95 |
| 4,742,357 A | 5/1988 | Rackley ............. 342/457 |
| 4,747,130 A | 5/1988 | Ho ................... 379/269 |
| 4,910,521 A | 3/1990 | Mellon ............... 342/45 |
| 5,034,961 A | 7/1991 | Adams ............... 375/130 |
| 5,068,916 A | 11/1991 | Harrison et al. ...... 455/39 |
| 5,231,634 A | 7/1993 | Giles et al. ......... 370/95.1 |
| 5,233,604 A | 8/1993 | Ahmadi et al. ....... 370/60 |
| 5,241,542 A | 8/1993 | Natarajan et al. ..... 370/95.3 |
| 5,317,566 A | 5/1994 | Joshi ................ 370/60 |
| 5,392,450 A | 2/1995 | Nossen .............. 455/12.1 |
| 5,412,654 A | 5/1995 | Perkins .............. 370/94.1 |
| 5,424,747 A | 6/1995 | Chazelas ............. 342/70 |
| 5,502,722 A | 3/1996 | Fulghum ............. 370/69.1 |
| 5,517,491 A | 5/1996 | Nanni et al. ......... 370/29 |

(Continued)

FOREIGN PATENT DOCUMENTS

CA  2132180  3/1996

(Continued)

OTHER PUBLICATIONS

Wong et al., "Soft Handoffs in CDMA Mobile Systems", Dec. 1997, IEEE Personal Communications.

(Continued)

*Primary Examiner*—John Pezzlo
*Assistant Examiner*—Inder Pal Mehra
(74) *Attorney, Agent, or Firm*—Randi L. Karpinia; Joseph J. Buczynski

(57) ABSTRACT

A system and method for enabling a node in a mobile wireless ad-hoc communications network to use a particular spreading code to spread a message to be transmitted to a destination node without having to provide information on the spreading code to the destination node in, for example, an RTS message, to thus improve the overall efficiency of the network. The system and method enables the node to select the spreading code based on the destination of that transmission message, along with other factors such as network prefix information, time of day, and provider information, to minimize destructive interference between the spread transmission messages transmitted by neighboring nodes in the network.

17 Claims, 2 Drawing Sheets

U.S. PATENT DOCUMENTS

| | | | | |
|---|---|---|---|---|
| 5,555,425 | A | 9/1996 | Zeller et al. | 395/800 |
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,642,377 | A | 6/1997 | Chung et al. | 375/200 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/347 |
| 5,774,876 | A | 6/1998 | Wooley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/350 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 395/297 |
| 5,850,392 | A * | 12/1998 | Wang et al. | 370/335 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/436 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,229,842 | B1 | 5/2001 | Schulist et al. | 375/148 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,512,784 | B2 * | 1/2003 | Schilling | 375/141 |
| 2001/0053699 | A1 | 12/2001 | McCrady et al. | 455/513 |
| 2002/0067756 | A1 * | 6/2002 | Schilling et al. | 375/130 |
| 2005/0054348 | A1 * | 3/2005 | Turina et al. | 455/453 |
| 2005/0137786 | A1 * | 6/2005 | Breed et al. | 701/200 |
| 2005/0164664 | A1 * | 7/2005 | DiFonzo et al. | 455/277.1 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

Arvind R. Raghavan and Carl W. Baum, "A Unslotted Multichannel Channel-Access Protocol for Distributed Direct Sequence Networks", Mobile Networks and Applications 5 (2000) pp. 49-56.

\* cited by examiner

SYSTEM AND METHOD FOR USING DESTINATION-DIRECTED SPREADING CODES IN A MULTI-CHANNEL METROPOLITAN AREA WIRELESS COMMUNICATIONS NETWORK

BACKGROUND OF THE INVENTION

1. Field of the Invention

The present invention relates to a system and method for using destination-directed spreading codes for communication between nodes in a multi-channel wireless communications network, such as an ad-hoc wireless communications network. More particularly, the present invention relates to a system and method which enables nodes in an ad-hoc wireless communications network to select a spreading code for a transmission message based on the destination of that transmission message, along with other factors such as network prefix information, time of day, and provider information, to minimize destructive interference between the spread transmission messages transmitted by neighboring nodes in the network, especially in a densely populated region such as a metropolitan area.

2. Description of the Related Art

Carrier Sense Multiple Access with Collision Avoidance (CSMA/CA) is a well-known protocol specified in the IEEE802.11 standard for wireless local area networks (LANs) which enables wireless communications devices to communicate with each other. CSMA/CA involves an initial handshake of a Request-to-Send (RTS) message followed by a Clear-to-Send (CTS) message exchanged between a source node and a destination node prior to sending an information message (e.g., a message containing audio, multimedia or data information).

Specifically, the source node transmits an RTS message to the intended destination node. If the intended destination node wishes to receive the message and believes that the channel is available (i.e., free of other traffic), the destination node responds with a CTS message. The receipt of the CTS message by the source node permits the transmission of the information message (MSG) which is typically followed by an Acknowledgment (ACK) message from the destination node when reception of the information message is successful. All other nodes within range of the CTS message mark the channel as busy for the duration of the message transfer. Provided that all nodes receive every CTS message, the protocol works well.

An example of a network employing CSMA/CA techniques is described in U.S. Pat. No. 6,404,756, issued on Jun. 11, 2002, the entire contents of which is incorporated herein by reference. In this type of network, a plurality of nodes communicate with each other using plural, shared parallel data channels and a separate reservation channel. As used herein, the term node refers to a communication device operating in a network of communication devices. The node may be a mobile communication device, such as a radio or wireless telephone, or the node may be stationary or fixed in a particular location. Also, as used herein, the term channel refers to a communication path between nodes, and different channels can exist on separate communication media or on a common communication medium, with individual channels being separated by any suitable means, such as time, frequency, or encoding.

Increased throughput is achieved by transferring messages over the multiple parallel data channels. One channel is dedicated for use as the reservation channel, and channel access is allocated on the multiple data channels in a distributed fashion. Access to the data channels is coordinated among the nodes by communicating message requests and corresponding replies on the separate reservation channel.

As can be appreciated by one skilled in the art, the performance of multi-channel multi-hop ad-hoc wireless local area networks (LANs) are highly dependent on the amount of time required to make a reservation for a data channel. An improved channel access protocol for use by nodes having a single receiver configuration in an ad-hoc communications network employing multi-channel carrier-sense multiple access with extended collision avoidance (MC-CSMA/E-CA) is described U.S. Pat. No. 6,768,730 issued on Jul. 27, 2004, the entire contents of which being incorporated herein by reference. This protocol negotiates the channel, data rate, power level, and message length between a pair of ad-hoc nodes via the Request-To-Send/Clear-To-Send (RTS/CTS) protocol. Because the network contains data rate adaptation, the RTS/CTS may be sent out at the lowest data rate and the highest power level to maximize the coordination of the reservation channel. If the data rate for the message channel is high, the amount of time spent on the data channel can be comparable to the amount of time required for the reservation. Accordingly, it is especially important to minimize the number of bits required to accomplish a reservation. This requirement can be balanced against the requirements to reliably contact the destination address, to negotiate higher data rates that are especially important for large messages, and to use message length to declare the length of the reservation.

It should also be noted that in the type of multi-hop ad-hoc wireless network described in U.S. Pat. No. 6,768,730 referenced above, the transceivers of the nodes use spreading codes to spread the messages being transmitted to other nodes for reasons such as to reduce message receipt errors and improve the bit error rate (BER) ratio, to name a few. Other types of spreading techniques are set forth in U.S. Pat. No. 5,943,322 to Mayor, the entire content of which is incorporated herein by reference. As can be appreciated by one skilled in the art, the use of multiple spreading codes and multiple channels by neighboring nodes in a network thus provides for better geographic reuse of channels, reduces the hidden terminal problem, and reduces destructive interference caused by messages received by a node from other nodes outside of the reliable reception range.

For example, the modem of any node in the network described in U.S. Pat. No. 6,768,730 can use gold codes for direct sequence spreading. In one exemplary configuration, a total of 129 codes are available for use. In order for a destination node to properly be able to receive the spread transmitted message, the destination node must know the spreading code that was used by the transmitting node to spread the transmitted message. One approach for enabling a transmitting node to indicate to a destination node the particular spreading code that it has used to spread a transmission message is to provide this information in the RTS message. However, designation of the spreading code would require an additional 7 bits in the RTS message at an additional cost of 14 microseconds. Currently, in the network described in U.S. Pat. No. 6,768,730 referenced above, the RTS length is 61 bits and the information rate is 500 kbps for a total length of 122 microseconds. Adding these bits to designate code increases the length of the RTS by 11%. Additionally, these bits must be replicated within the CTS to inform nodes which can hear the destination node but not the source node. These other nodes are thus required to designate the code as "in use" to avoid a competing transmission.

An alternative to this approach would be to add the bits to designate the spreading code and increase the data rate to 750 kbps or 1 Mbps. Unfortunately, this reduces the range at which a node can successfully decode the RTS message. Reduction in range has severe consequences on the network, such as an increase in the amount of additional infrastructure needed for the network to service a congested region, such as a metropolitan area.

A technique in which the transmitting node in a distributed direct-sequence network selects a spreading code to spread the transmission signal based on the spreading code assigned to the destination node is generally described in a publication by Arvind R. Raghavan and Carl W. Baum entitled "An unslotted multichannel channel-access protocol for distributed direct-sequence networks", Mobile Networks and Applications, Vol. 5 (2000), pp. 49–56, the entire contents of which being incorporated by reference herein. However, the suitability of this technique for use in ad-hoc networks servicing densely populated regions, such as metropolitan areas, has not been addressed. Also, this technique has not been applied to more sophisticated ad-hoc networks employing access points which provide access to other networks such as the PSTN, other ad-hoc networks, or the Internet, to name a few.

Accordingly, a need exists for a system and method that enables a node in an ad-hoc communications network to use a particular spreading code to spread a message to be transmitted to a destination node without having to provide information on the spreading code to the destination node in, for example, an RTS message, to thus improve the overall efficiency of the network.

SUMMARY OF THE INVENTION

An object of the present invention is to provide an improved system and method for enabling neighboring nodes in an ad-hoc wireless communications network to use particular spreading codes to spread their respective transmission messages to minimize destructive interference between the spread transmission messages transmitted by the neighboring nodes.

A further object of the present invention is to enable a node in an ad-hoc communications network to use a particular spreading code to spread a message to be transmitted to a destination node without having to provide information on the spreading code to the destination node in, for example, an RTS message, to thus improve the overall efficiency of the network.

These and other objects of the present invention are substantially achieved by providing a system and method for enabling a node, adapted for use in a wireless mobile ad-hoc wireless communications network, to use a spreading code to spread a transmission message without having to send information pertaining to the spreading code to the destination node for the transmission message. The network can be, in particular, a multi-channel mobile wireless ad-hoc network. The system and method enables the node to select the spreading code based on the destination of that transmission message, along with other factors such as network prefix information, time of day, and provider information, to minimize destructive interference between the spread transmission messages transmitted by neighboring nodes in the network. The network can further include at least one access point which enables the nodes to communicate with other networks such as the PSTN, other ad-hoc networks, and the Internet.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
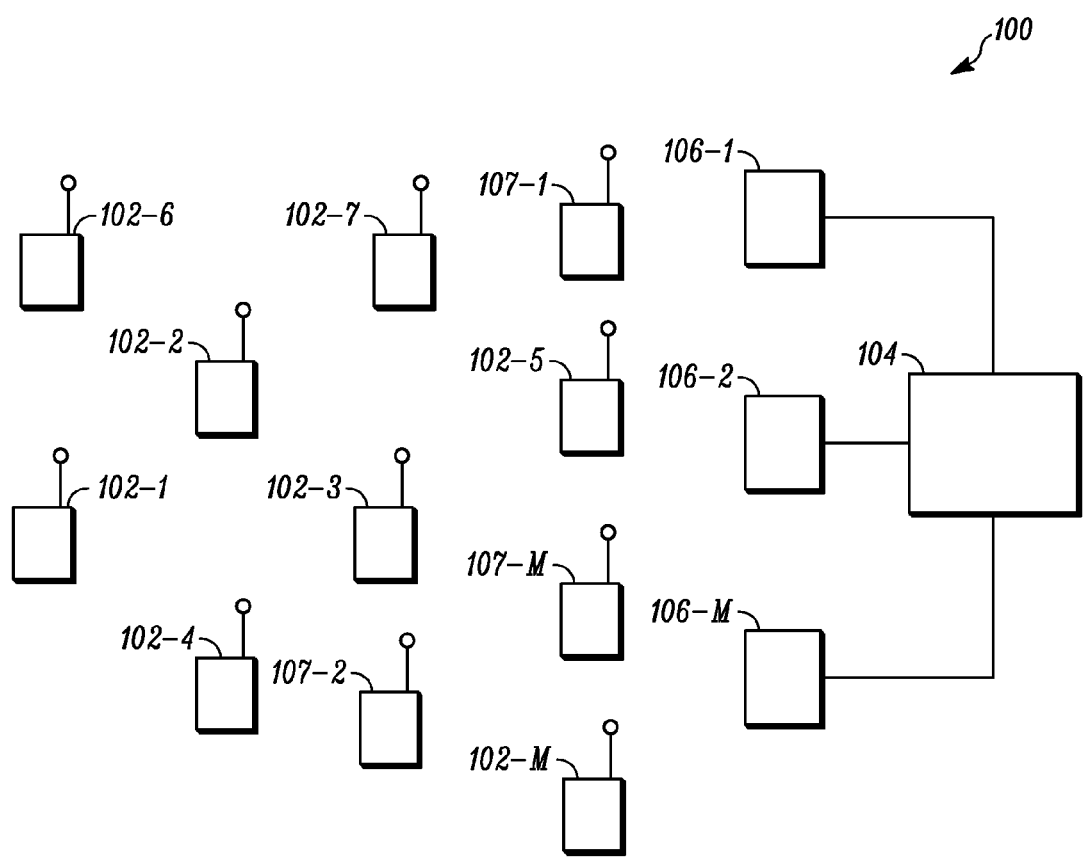
FIG. 1 is a block diagram of an example of an ad-hoc wireless communications network including a plurality of nodes that are each capable of generating a particular spreading code to spread their respective messages being transmitted to respective destination nodes in accordance with an embodiment of the present invention.

FIG. 1 is a block diagram illustrating an example of a wireless communications network 100 employing an embodiment of the present invention. Specifically, the network 100 can be an ad-hoc packet switched network, which includes a plurality of mobile nodes 102-1 through 102-$n$ (referred to generally as nodes 102 or mobile nodes 102), and a fixed network 104 having a plurality of fixed nodes or access points 106-1, 106-2, . . . , 106-$n$ (referred to generally as nodes 106 or fixed nodes 106), for providing the mobile nodes 102 with access to the fixed network 104. A node 102 can be a wireless telephone, radio, user terminal or any other suitable mobile wireless device. The fixed network 104 includes, for example, a core local access network (LAN), and a plurality of servers and gateway routers, to thus provide the mobile nodes 102 with access to other networks, such as the public switched telephone network (PSTN) and the Internet. The network further includes a plurality of wireless routers 107-1, 107-2 through 107-$n$ (referred to generally as nodes 107) which are capable of routing data packets to other nodes 102, 106 or 107.

Figure 2:
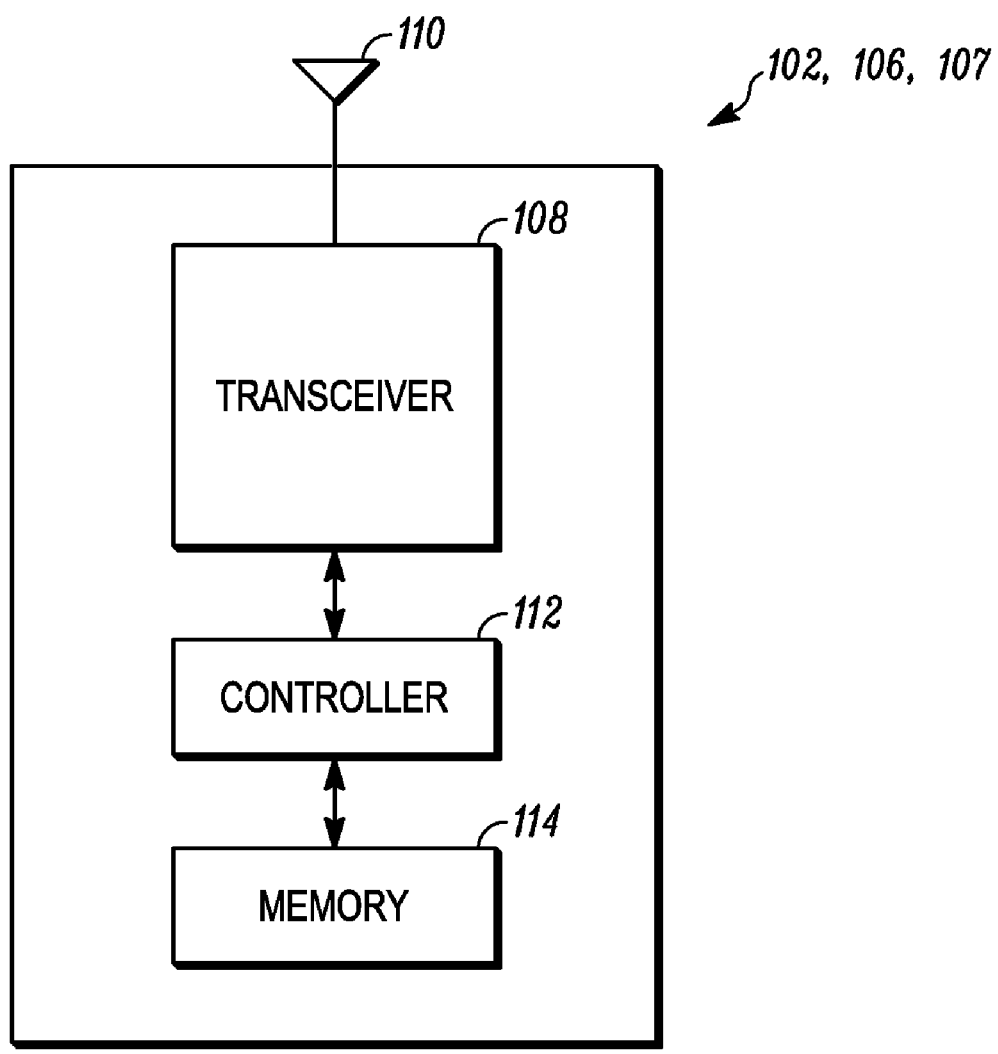
FIG. 2 is a block diagram of an example of a wireless node as shown in FIG. 1.

As shown in FIG. 2, each mobile node 102, fixed node 106 or wireless router 107 includes a modem which is essentially a transceiver 108 including a transmitter and a receiver, which collectively can be referred to as a modem, and which are coupled to an antenna 110 and capable of respectively transmitting and receiving signals, such as packetized data signals, under the control of a controller 112. The packetized data signals can include, for example, voice, data or multimedia. Each node 102, 106, 107 further includes a memory 114, which can include a random access memory (ROM) for storing information pertaining to the operation of the node 102, 106, 107 and a random access memory (RAM) for storing information such as routing table information and the like in accordance with which data packets are transmitted, received and routed by the transceiver 108. Further details of these types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, and in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004 the entire content of both of said patent applications being incorporated herein by reference.

Each mobile node 102, fixed node 106 and wireless router 107 can communicate over plural data channels as well as a reservation channel, as described in U.S. Pat. Nos. U.S. Pat. No. 6,404,756 and 6,768,730 referenced above. These channels are not limited to any particular architecture or configuration, so long as each node 102, 106, 107 has the ability to access the channels. The channels can exist over any communication medium, such as wire, optical fiber, or wireless (over-the-air), and may employ any suitable transmission protocol.

When a node, for example, node 102-1, wishes to transmit a message to another node, for example, node 102-2, node 102-1 transmits a Request-to-Send (RTS) message to node 102-2 in order to notify node 102-2 and other nodes 102 and 106 of its intent to reserve one of the available data channels. The RTS message is transmitted by node 102-1 on the reservation channel. When a node 102, 106 or 107 is not engaged in transmission or reception of messages on one of the data channels, its receiver is tuned to the reservation channel. However, when a node 102, 106 or 107 is engaged in the transmission or reception of messages on one of the data channels, the receiver is tuned to that data channel instead of the reservation channel. Consequently, each node 102, 106 and 107 is continuously monitoring the reservation channel with its receiver when it is not transmitting or receiving a message on one of the data channels.

Upon receiving the RTS from node 102-1 on the reservation channel, assuming a data channel is available, node 102-2 replies to node 102-1 with a CTS message on the reservation channel. Upon receiving the CTS message, node 102-1 then transmits the information message to node 102-2 on the available data channel, for example, data channel 1. Because channel access requests are transmitted on the separate reservation channel, another node 102, 106 or 107 can transmit an RTS message shortly after a previous RTS/CTS exchange is completed without waiting for the subsequent information message to be completed.

As discussed in the Background section above, the modem of each node 102, 106, 107 has a number of different spreading codes which can be used to transmit a message. For example, each modem can use gold codes for direct sequence spreading. In one exemplary configuration, a total of 129 codes are available for use.

As further discussed in the Background section above, in order to reduce destructive interference between messages transmitted by neighboring nodes 102, 106, 107, the controller 112 of each node 102, 106, 107 within a neighborhood of nodes can control the modem in the transceiver 108 of the node to select a spreading code to spread its transmission message which is different than any spreading code used by the modems of the neighboring nodes to spread their transmission messages. The manner in which the controller can control the modem to select the particular spreading code can be based on a random algorithm.

However, as discussed above, in order for the destination node to be able to properly receive and despread the spreaded message, the destination node needs to know the spreading code by which the message has been spread. In the systems discussed in the Background section above, a transmitting node can provide this spreading code information to a destination node in the RTS message that it sends to the destination node. However, this additional information increases the length of the RTS message, as well as the length of the CTS message transmitted by the destination node, for reasons discussed in the Background section above.

Hence, in order to eliminate the need to include this spreading code information in the RTS message, a technique according to an embodiment of the present invention uses the destination address of the destination node as an element of the random algorithm which determines the spreading code for a message transfer. By randomizing the choice of spreading code using a necessary piece of information, such as destination address, as the seed based on which the spreading code is selected eliminates the need to designate a field in the RTS or CTS message to carry this information.

That is, the memory 114 and controller 112 of each node 102, 106 and 107 will include information pertaining to the random algorithm that is used by each node to generate a spreading code. When a destination node (e.g., node 102-2) receives an RTS message from a transmitting node (e.g., node 102-1), the controller 112 of destination node 102-2 will be aware that the transmitting node 102-1 will be spreading the transmission message with a spreading code based on a random algorithm that takes into account the destination address of the destination node 102-2. Because the controller 112 of the destination node 102-2 knows the address of destination node 102-2, the controller 112 will be above to use this destination address in conjunction with the random algorithm to control the modem of destination node 102-2 to use the appropriate code to despread the received message transmitted from the transmitting node 102-1. The destination node 102-2 is therefore able to perform this dispreading operation without the transmitting node 102-1 having to send to the destination node 102-2 any information pertaining to the spreading code that the transmitting node 102-1 used to spread the transmitted message.

In addition to using the destination address, the technique according to an embodiment of the present invention could one or more other elements as the seed based on which the spreading code is chosen. The other elements of the seed may include, for example, information pertaining to a network prefix (i.e., the network ID portion of an IP address), information pertaining to the time of day, and provider key information indicative of a particular type of provider network, to name a few. By using destination address as an element, along with any or all of these other elements to select the spreading code, the nodes 102, 106, 107 of the network are likely to have additional protection against mutual interference. As discussed in the Background section above, the MC-CSMA/E-CA protocol is effective at reducing collisions between messages, but does not necessarily prevent any collisions from occurring. Furthermore, as can be appreciated by one skilled in the art, messages transmitted a higher data rates have less coding gain, and therefore, provide less protection against a colliding message transfer. The use of multiple spreading codes thus provides an additional coding gain with a magnitude which is dependent on transmission rate.

Another advantage provided by the spreading code selection technique described above is to provide the ad-hoc network 100 with the ability to easily support global roaming in a densely populated region having many nodes 102, 106, 107, such as a metropolitan area. Specifically, once a subscriber device (e.g., a node 102) moves into an area, it can associate with the network 100 and easily move around within the network 100. This ease of movement is provided by the ability for a node 102 to know the spreading code to which a potential relayer (e.g., another node 102, 107, 107) is listening. This is especially important for a node 102 moving through a metropolitan area at highway speed. In this application, the node 102 must be able to quickly adjust its routing table to maintain connectivity with other nodes 102, 106, 107. Wasting time learning the spreading codes in adjacent areas reduces the ability of a node 102 to maintain a consistent level of service.

The technique discussed above further permits the network operator of a network 100 deployed in a metropolitan area to use multiple code and multiple channels in a wireless ad-hoc network providing integrated voice and data to subscriber terminals. Additionally, this technology can be deployed to opportunistic ad-hoc networks where groups of individuals can convene for a coordinated rescue, interactive gaming, and other activities. For example, since an ad-hoc network can be established to exchange data of any kind, a group of users can use their nodes to, for example, play an Internet game (e.g., Quake, Ultimate Tournament) against one another without requiring an Internet connection. The bandwidth provided by the ad-hoc network is much greater than that provided via standard Internet connections. In addition, the spreading codes allow multiple user pairs to transmit data (e.g., game information) between nodes in parallel.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A mobile wireless ad-hoc communications network, comprising:
   a plurality of nodes for communicating with each other, wherein each of the plurality of nodes comprises a memory for storing a spreading algorithm and a plurality of spreading sequences, and
   a transmitting node comprising:
      a controller for using said spreading algorithm along with information pertaining to an address of another one of said nodes and at least one other factor to select a spreading sequence from said plurality of stored spreading codes, and for applying a said spreading sequence to said communications signal to spread said communications signal, and
      a transmitter for transmitting said spread communications signal to said plurality of nodes; and
   said another one of said nodes comprising:
      a receiver for receiving said spread communications signal, and
      a controller for using said spreading algorithm along with information pertaining to said address of another one of said nodes and said at least one other factor to identify said spreading sequence from said plurality of stored spreading codes, and for applying said spreading sequence to said communications signal to despread said communications signal.

2. The mobile wireless ad-hoc communications network as claimed in claim 1, wherein:
   said at least one other factor includes at least one of a network prefix, time of day, and provider information.

3. The mobile wireless ad-hoc communications network as claimed in claim 1, further comprising:
   at least one access point for enabling said nodes to communicate with another network;
   said other network includes at least one of a PSTN, another ad-hoc network and the Internet.

4. A method for communicating in a mobile wireless ad-hoc communications network, comprising:
   enabling a plurality of nodes in said network to communicate with each other;
   storing a spreading algorithm in a memory of each of said plurality of nodes;
   storing a plurality of spreading sequences in said memory of each of said plurality of nodes;
   within a transmitting node of said plurality of nodes, applying a spreading sequence to said communications signal to spread said communications signal, said spreading sequence being selected from said plurality of stored spreading sequences using said spreading algorithm based on information pertaining to an address of another one of said plurality of nodes to which said transmitting node is transmitting, and information pertaining to at least one other factor;
   transmitting said spreaded communication signal to said another one of said plurality of nodes; and
   within said another one of said plurality of nodes:
      receiving said spreaded communication signal
      identifying said spreading sequence from said plurality of stored spreading sequences using said spreading algorithm based on information pertaining to said address of said another one of said plurality of nodes and information pertaining to at least one other factor.

5. The method as claimed in claim 4, wherein:
   said at least one other factor includes at least one of a network prefix, time of day, and provider information.

6. A method for communicating messages among a plurality of nodes within an ad hoc communications network, the method comprising:
   storing a spreading algorithm in each of the plurality of nodes;
   within a first node of the plurality of nodes:
      detecting and storing one or more network elements,
      generating a spreading code based on the spreading algorithm functioning on a destination address of a second node and the one or more network elements,
      spreading a transmission message destined for the second node with the spreading code, and
      transmitting the spreaded transmission message; and
   within the second node:
      detecting and storing the one or more network elements,
      receiving the spreaded transmission message from the first node,
      generating the spreading code using the spreading algorithm functioning with the destination node address and the one or more network elements, and
      despreading the spreaded transmission message using the spreading code.

7. A method for communicating messages among a plurality of nodes within an ad hoc communications network as claimed in claim 6, wherein the one or more network elements comprises one or more network elements selected from a group comprising a network prefix, a network identification, a time of day, a provider information, and a type of provider.

8. A method for communicating messages among a plurality of nodes within an ad hoc communications network as claimed in claim 6, wherein:
   the storing of the one or more network elements in the first node comprises updating a first routing table in the first node using the one or more network elements, and
   the storing of the one or more network elements in the second node comprises updating a second routing table in the second node using the one or more network elements.

9. A method for communicating messages among a plurality of nodes within an ad hoc communications network as claimed in claim 6, further comprising:
within a third node of the plurality of nodes:
detecting and storing a second set of one or more network elements,
generating a second spreading code based on the spreading algorithm functioning on a destination address of a fourth node and the second set of one or more network elements,
spreading a second transmission message destined for the fourth node with the second spreading code, and
transmitting the second spreaded transmission message; and
within the fourth node:
detecting and storing the second set of one or more network elements,
receiving the spreaded transmission message from the third node,
generating the second spreading code using the spreading algorithm functioning with the fourth node destination node address and the second set of one or more network elements, and
despreading the second spreaded transmission message with the second spreading code.

10. A method for communicating messages among a plurality of nodes within an ad hoc communications network as claimed in claim 9, wherein the one or more network elements comprises one or more elements selected from a group comprising a network prefix, a network identification, a time of day, a provider information, and a type of provider; and wherein the second set of one or more network elements comprises a second one or more elements selected from a group comprising a second network prefix, a second network identification, a second time of day, a second provider information, and a second type of provider.

11. A method for communicating messages among a plurality of nodes within an ad hoc communications network as claimed in claim 9, wherein:
the storing of the one or more network elements in the first node comprises updating a first routing table in the first node using the one or more network elements,
the storing of the one or more network elements in the second node comprises updating a second routing table in the second node using the one or more network elements,
the storing of the second set of one or more network elements in the third node comprises updating a third routing table in the first node using the second set of one or more network elements,
the storing of the second set of one or more network elements in the fourth node comprises updating a fourth routing table in the fourth node using the second set of one or more network elements.

12. A method for communicating messages among a plurality of nodes within an ad hoc communications network as claimed in claim 6, further comprising:
within the first node:
detecting and storing a second set of one or more network elements,
generating a second spreading code based on the spreading algorithm functioning on a destination address of a third node and the second set of one or more network elements,
spreading a second transmission message destined for the third node with the second spreading code, and
transmitting the spreaded second transmission message; and
within the third node:
detecting and storing the second set of one or more network elements,
receiving the second spreaded transmission message from the first node,
generating the second spreading code using the spreading algorithm functioning with the third node destination node address and the second set of one or more network elements, and
despreading the second spreaded transmission message using the second spreading code.

13. A method for communicating messages among a plurality of nodes within an ad hoc communications network as claimed in claim 12, wherein the one or more network elements comprises one or more elements selected from a group comprising a network prefix, a network identification, a time of day, a provider information, and a type of provider; and wherein the second set of one or more network elements comprises a second one or more elements selected from a group comprising a second network prefix, a second network identification, a second time of day, a second provider information, and a second type of provider.

14. A method for communicating messages among a plurality of nodes within an ad hoc communications network as claimed in claim 12, wherein:
the storing of the one or more network elements in the first node comprises updating a first routing table in the first node using the one or more network elements,
the storing of the one or more network elements in the second node comprises updating a second routing table in the second node using the one or more network elements,
the storing of the second set of one or more network elements in the first node comprises updating the first routing table in the first node using the second set of one or more network elements,
the storing of the second set of one or more network elements in the third node comprises updating a third routing table in the third node using the second set of one or more network elements.

15. A method for communicating messages among a plurality of nodes within an ad hoc communications network, the method comprising:
storing a spreading algorithm in each of the plurality of nodes;
storing a plurality of spreading codes within each of the plurality of nodes;
within a first node of the plurality of nodes:
detecting and storing one or more network elements,
selecting a spreading code from the plurality of stored spreading codes based on the spreading algorithm functioning on a destination address of a second node and the one or more network elements,
spreading a transmission message destined for the second node with the selected spreading code, and
transmitting the spreaded transmission message; and
within the second node:
detecting and storing the one or more network elements,
receiving the spreaded transmission message from the first node,
identifying the spreading code from the plurality of stored spreading codes using the spreading algorithm functioning with the destination node address and the one or more network elements, and despreading the spreaded transmission message using the spreading code.

16. A method for communicating messages among a plurality of nodes within an ad hoc communications network as claimed in claim 15, further comprising:
within a third node of the plurality of nodes:
detecting and storing a second set of one or more network elements,
selecting a second spreading code from the plurality of stored spreading codes based on the spreading algorithm functioning on a destination address of a fourth node and the second set of one or more network elements,
spreading a second transmission message destined for the fourth node with the second spreading code, and
transmitting the second spreaded transmission message; and
within the fourth node:
detecting and storing the second set of one or more network elements,
receiving the second spreaded transmission message from the third node,
identifying the second spreading code from the plurality of stored spreading codes using the spreading algorithm functioning with the fourth node destination node address and the second set of one or more network elements, and
despreading the second spreaded transmission message with the second spreading code.

17. A method for communicating messages among a plurality of nodes within an ad hoc communications network as claimed in claim 15, further comprising:
within the first node:
detecting and storing a second set of one or more network elements,
selecting a second spreading code from the plurality of stored spreading codes based on the spreading algorithm functioning on a destination address of a third node and the second set of one or more network elements,
spreading a second transmission message destined for the third node with the second spreading code, and
transmitting the spreaded second transmission message; and
within the third node:
detecting and storing the second set of one or more network elements,
receiving the second spreaded transmission message from the first node,
identifying the second spreading code from the plurality of stored spreading codes using the spreading algorithm functioning with the third node destination node address and the second set of one or more network elements, and
despreading the second spreaded transmission message using the second spreading code.

* * * * *